(12) United States Patent
Kissinger

(10) Patent No.: US 8,695,619 B2
(45) Date of Patent: Apr. 15, 2014

(54) GAS DIVERSION DEVICE AND METHOD FOR PIPE REPAIR THEREWITH

(75) Inventor: Richard L. Kissinger, Lubbock, TX (US)

(73) Assignee: Atmos Energy Corporation, Dallas, TX (US)

( * ) Notice: Subject to any disclaimer, the term of this patent is extended or adjusted under 35 U.S.C. 154(b) by 322 days.

(21) Appl. No.: 13/304,133

(22) Filed: Nov. 23, 2011

(65) Prior Publication Data

US 2012/0125457 A1 May 24, 2012

Related U.S. Application Data

(60) Provisional application No. 61/416,490, filed on Nov. 23, 2010.

(51) Int. Cl.
*F16L 41/00* (2006.01)
(52) U.S. Cl.
USPC ............... 137/15.08; 137/315.01; 137/561 A; 285/132.1
(58) Field of Classification Search
USPC .............. 137/1, 15.03, 15.08, 561 A, 315.01; 138/97; 285/132.1, 131.1
See application file for complete search history.

(56) References Cited

U.S. PATENT DOCUMENTS

| | | | | |
|---|---|---|---|---|
| 2,144,818 A | * | 1/1939 | Stone et al. | 166/132 |
| 4,597,147 A | * | 7/1986 | Henry | 138/97 |
| 4,823,651 A | * | 4/1989 | England | 81/124.4 |
| 5,689,938 A | * | 11/1997 | Lyall et al. | 137/15.08 |

* cited by examiner

*Primary Examiner* — Kevin Lee
(74) *Attorney, Agent, or Firm* — Howison & Arnott, L.L.P.

(57) ABSTRACT

A gas diversion device includes a compression coupling having a gasket disposed therein, and a first straight pipe section coupled to the compression coupling. The device further includes a Y-pipe coupled to the first straight pipe section and an electrically conductive pipe. The device further includes a threaded cap having a hole therethrough. The compression coupling is placed over an open end of a broken gas pipe service riser and the first straight pipe section receives a portion of the gas pipe service riser therein. The threaded cap receives an expansion plug tool through the first hole, and the Y-pipe and the first straight pipe slideably receive a portion of the expansion plug tool therein. The expansion plug tool further includes an expansion plug coupled thereto to facilitate positioning of the expansion plug within the open end of the gas pipe service riser.

20 Claims, 7 Drawing Sheets

GAS DIVERSION DEVICE AND METHOD FOR PIPE REPAIR THEREWITH

CROSS-REFERENCE TO RELATED APPLICATIONS

This application claims benefit of U.S. Provisional Application No. 61/416,490, filed Nov. 23, 2010, the specification of which is incorporated herein in its entirety.

TECHNICAL FIELD

The following disclosure relates to a device for use in repairing broken gas line service risers, and more particularly a gas diversion device for diverting escaped gas away from a worker during a repair operation of a broken gas line service riser.

BACKGROUND

Gas meters are used to measure the amount of gas, such as natural gas, provided to a customer by a gas provider. Often gas pipes that supply a gas meter include portions that are above the ground, referred to as service risers, which may be in an exposed position. This exposes the gas pipe to the potential for damage, such as when a driver of a car inadvertently bumps the car into the gas pipe. If a gas pipe is broken or ruptured as a result, gas will escape from the service riser around the area of the break. This results in a dangerous situation in that a spark could ignite the escaping gas. In addition, the escaping gas can displace the oxygen in the area surrounding the break, presenting the danger of asphyxiation. Both of these issues could result in severe injury or death to a worker who is trying to repair the broken service riser.

SUMMARY

An embodiment of a gas diversion device includes a compression coupling having a first gasket disposed therein, and a first straight pipe section having a first open end and a second open end. The first open end is coupled to the compression coupling. The gas diversion device further includes a Y-pipe having a first Y-pipe portion including a first Y-pipe open end and a second Y-pipe open end, the first Y-pipe open end being coupled to the second open end of the first straight pipe section, and the Y-pipe further including a second Y-pipe portion having a second Y-pipe portion open end. The gas diversion device further includes an electrically conductive pipe having a first end coupled to the second Y-pipe portion open end, and a slip to thread male adaptor coupled to the second Y-pipe open end, the slip to thread adaptor having a first threaded portion. The gas diversion device further includes a threaded cap threadably coupled to the first threaded portion and having a first hole therethrough. The compression coupling is adapted to be placed over an open end of a gas pipe service riser and the first straight pipe section is adapted to receive a portion of the gas pipe service riser therein. The threaded cap is adapted to receive an expansion plug tool through the first hole and the first Y-pipe portion and the first straight pipe portion are adapted to slideably receive a portion of the expansion plug tool therein. The expansion plug tool further includes an expansion plug coupled thereto to facilitate positioning of the expansion plug within the open end of the gas pipe service riser.

An embodiment of a method for diverting gas from a broken gas pipe service riser uses a gas diversion device having a compression coupling, and a first straight pipe section having a first open end and a second open end in which the first open end is coupled to the compression coupling. The gas diversion device further has a Y-pipe having a first Y-pipe portion including a first Y-pipe open end and a second Y-pipe open end in which the first Y-pipe open end is coupled to the second open end of the first straight pipe section and the Y-pipe further includes a second Y-pipe portion having a second Y-pipe portion open end. The gas diversion device further has an electrically conductive pipe having a first end coupled to the second Y-pipe portion open end, a slip to thread male adaptor coupled to the second Y-pipe open end and having a first threaded portion, and a threaded cap threadably coupled to the first threaded portion and having a first hole therethrough. The method includes selecting a first gasket having an inner diameter corresponding to an outer diameter of the broken gas pipe service riser, disposing the first gasket within the compression ring and placing the compression coupling over an open end of the broken gas pipe service riser such that the open end of the broken gas pipe service riser passes through the first gasket and the first pipe section receives a portion of the gas pipe service riser therein. The method further includes sliding a portion of an expansion plug tool having an expansion plug attached thereto through the first hole, the first Y-pipe portion and the first straight pipe section, positioning the expansion plug within the open end of the gas pipe service riser, and detaching the expansion plug from the expansion plug tool.

In another embodiment, a gas diversion device comprises an elongated body having an upper end and a lower end, with an enclosed longitudinal passageway disposed along a longitudinal axis between the upper end and the lower end. The body has an upper portion proximate to the upper end and a lower portion proximate to the lower end. The upper portion includes a bifurcated section defining a first path and a second path; the first path constituting a portion of the longitudinal passageway and the second path originating from the longitudinal passageway and extending from the side of the body at an angle to the longitudinal axis. The lower portion of the body is at least partially formed of a transparent material such that the interior of the longitudinal passageway is visible through the body from the exterior of the body. A first partial closure is removably mounted on the upper end of the body. The first partial closure defines, when mounted on the upper end of the body, a first hole therethrough generally aligned with the longitudinal axis and having a cross-sectional area that is smaller than the cross-sectional area of the longitudinal passageway at the upper end of the body. A second partial closure is mounted on the lower end of the body, the second partial closure defining a second hole therethrough generally aligned with the longitudinal axis and having a cross-sectional area that is smaller than the cross-sectional area of the longitudinal passageway at the lower end of the body. An electrically conductive pipe having a first end is coupled to the bifurcated section and defines an enclosed passageway disposed along the second path extending away from the body. The enclosed passageway of the electrically conductive pipe is in fluid communication with the longitudinal passageway of the body.

In another embodiment, the first partial closure of the gas diversion device is configured such that the first hole is large enough to allow the passage of an expansion plug tool from the exterior of the device into the longitudinal passageway, but too small to allow the passage of an expansion plug from the exterior of the device into the longitudinal passage.

In another embodiment, the first partial closure is removably mounted to the upper end of the body by means of a threaded connection.

In another embodiment, the second partial closure of the gas diversion device comprises a flexible annular gasket configured to provide a substantially gas-tight seal around a pipe of a predetermined diameter extending from the exterior of the device into the lower portion of the longitudinal passageway.

In another embodiment, the second partial closure includes an upper portion removably connected to a lower portion such that the flexible annular gasket is removably held in position therebetween when the lower portion is connected to the upper portion.

In another embodiment, the second partial closure is configured to interchangeably hold any one of a plurality of flexible annular gaskets configured to seal around pipes of different predetermined diameters.

In another embodiment, the gas diversion device further comprises a ground connection configured provide an electrical connection between the electrically conductive pipe and a ground.

BRIEF DESCRIPTION OF THE DRAWINGS

For a more complete understanding, reference is now made to the following description taken in conjunction with the accompanying Drawings in which.

DETAILED DESCRIPTION

Figure 1:
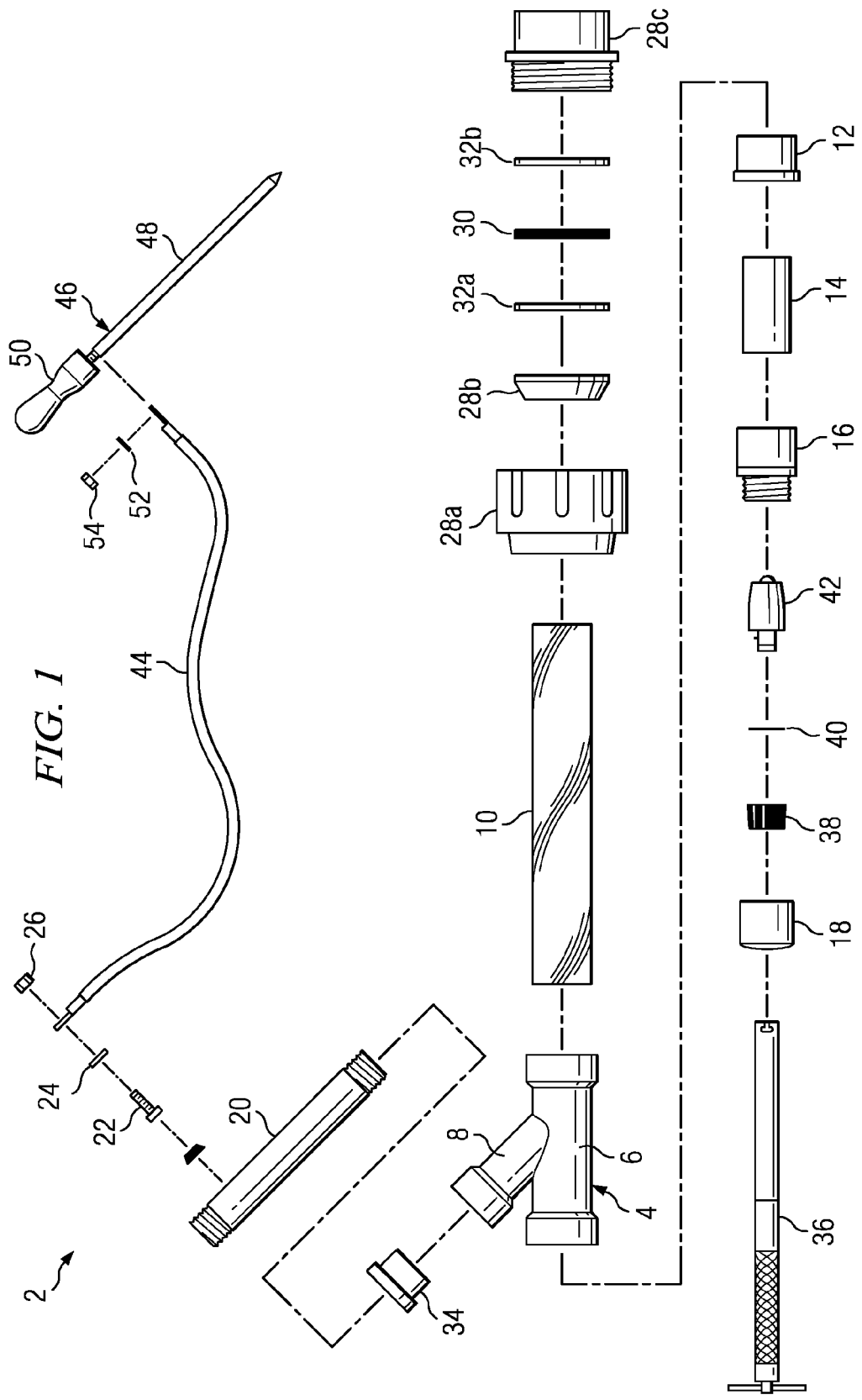
FIG. 1 illustrates an exploded profile view of an embodiment of a gas diversion device.

In one embodiment, a gas diversion device comprises an elongated body having an upper end and a lower end, with an enclosed longitudinal passageway disposed along a longitudinal axis between the upper end and the lower end. The body has an upper portion proximate to the upper end and a lower portion proximate to the lower end. The upper portion includes a bifurcated section defining a first path and a second path; the first path constituting a portion of the longitudinal passageway and the second path originating from the longitudinal passageway and extending from the side of the body at an angle to the longitudinal axis. The lower portion of the body is at least partially formed of a transparent material such that the interior of the longitudinal passageway is visible through the body from the exterior of the body. A first partial closure is removably mounted on the upper end of the body. The first partial closure defines, when mounted on the upper end of the body, a first hole therethrough generally aligned with the longitudinal axis and having a cross-sectional area that is smaller than the cross-sectional area of the longitudinal passageway at the upper end of the body. A second partial closure is mounted on the lower end of the body, the second partial closure defining a second hole therethrough generally aligned with the longitudinal axis and having a cross-sectional area that is smaller than the cross-sectional area of the longitudinal passageway at the lower end of the body. An electrically conductive pipe having a first end is coupled to the bifurcated section and defines an enclosed passageway disposed along the second path extending away from the body. The enclosed passageway of the electrically conductive pipe is in fluid communication with the longitudinal passageway of the body.

Many embodiments of the gas diversion device are possible. In the embodiment described and illustrated in, e.g., FIGS. 1-2, the elongated body comprises the elements designated by reference numbers 4, 10, 12, 14 and 16. The upper portion comprises the elements designated by reference numbers 4, 12, 14 and 16, whereas the lower portion comprises the element designated by reference number 10. The bifurcated section comprises element 4, with the first path being defined by the element designated by reference number 6 and the second path being defined by the element designated by reference number 8. The first partial closure comprises the element designated by reference number 18, the second partial closure comprises the element designated by reference number 28 and the electrically conductive pipe comprises the element designated by reference number 20.

FIG. 1 illustrates an exploded profile view of an exemplary embodiment of a gas diversion device 2. In this embodiment, the gas diversion device 2 includes a Y-pipe 4 having a first Y-pipe portion 6 and a second Y-pipe portion 8. The first Y-pipe portion 6 includes a substantially straight pipe section extending along a first axis and having pipe openings at each end. The second Y-pipe portion 8 includes a substantially straight pipe section that extends along a second axis and intersects the first Y-pipe portion 6. The second Y-pipe portion 8 has a pipe opening at an end opposite to intersect with the first Y-pipe portion 6. In a particular embodiment, the second Y-pipe portion 8 intersects the first Y-pipe portion 6 at a substantially 45-degree angle. In other embodiments (not shown), the second Y-pipe portion 8 may intersect the first Y-pipe portion at a 90-degree angle (which may also be called a T-pipe) or at another angle in the range from about 25 degrees to 90 degrees. The Y-pipe 4 is configured to fluidly couple interiors of the first Y-pipe portion 6 and the second Y-pipe portion 8. In at least one embodiment, the Y-pipe 4 is constructed of a PVC material. In a particular embodiment, the Y-pipe 4 is a 2"×1½"×1½" Y-pipe. The gas diversion device 2 further includes a first straight pipe section 10 having a first opening coupled to the first opening of the first Y-pipe portion 6 of the Y-pipe 4. In at least one embodiment, the first straight pipe section 10 is constructed of a substantially transparent material allowing a user to view the interior portion thereof. In a particular embodiment, the first straight pipe section 10 is a 12" clear schedule 40 PVC pipe. The gas diversion device 2 may further include a female slip adapter 12 having an outer portion that couples to the end of the first Y-pipe portion 6 opposite to that of the first straight pipe section 10, and an inner portion which couples to a second straight pipe section 14. In at least one embodiment, the female slip adapter 12 is a 1½" by 1¼" female slip adapter constructed of a PVC material. In a particular embodiment, the second straight pipe section 14 is a 3" length of 1½" schedule 40 PVC pipe. The other end of the second straight pipe section 14 is connected to a slip to thread male adapter 16. The slip to thread male adapter 16 includes a female portion adapted to couple with the second straight pipe section 14 and a threaded male portion. In a particular embodiment, the slip to thread male adapter 16 is a PVC Red male adapter of 1½"×1¼". The threaded male end of the slip to thread male adapter 16 is configured to be threadedly coupled to a threaded cap 18 having threads within an interior portion thereof. In a particular embodiment, the threaded cap 18 is a PVC threaded 1¼" flat cap. The threaded cap 18 includes a hole in the top thereof which passes into the interior portion thereof.

The gas diversion device 2 further includes an electrically conductive pipe 20 coupled to the opening of the second Y-pipe portion 8 via a female threaded adapter 34. The conductive pipe 20 may be threadedly coupled to a threaded portion of a female threaded adapter 34 and an unthreaded portion of the female threaded adapter 34 is coupled to the opening of the second Y-pipe portion 8. In a particular embodiment, the conductive pipe 20 is a 1¼" by 8" steel pipe and the female threaded adapter 34 is a 1½"×1¼" female threaded adapter constructed of PVC. The conductive pipe 20 includes a grounding bolt 22 affixed to an exterior portion of the steel pipe 20. A grounding bolt washer 24 and grounding bolt nut 26 are disposed on a threaded shaft of the grounding bolt 22. Although the illustrated embodiment uses a steel pipe, it should be understood that in other embodiments any electrically conductive material may be used for the conductive pipe 20, including but not limited to brass, copper, zinc, stainless steel, electrically conductive plastic and electrically conductive carbon fiber.

The gas diversion device 2 may further include a compression coupling 28, which includes a female portion 28a, a compression ring 28b, and a male portion 28c. The female portion 28a is adapted to be coupled to the first straight pipe section 10 at an open end opposite to the end coupled to the Y-pipe 4. The compression ring 28b is disposed within the female portion 28a. A first neoprene gasket 30 is positioned between a first flat washer 32a and a second flat washer 32b in a stacked arrangement, and the first neoprene gasket 30, first flat washer 32a and second flat washer 32b are positioned within the female portion 28a with the first flat washer 32a abutting against the compression ring 28b. In at least one embodiment, an inner diameter of the first neoprene gasket 30 is selected to be substantially equal to an outer diameter of a pipe to be repaired as will be further described herein. During assembly of the compression coupling 38, the male portion 28c is threadedly coupled to the female portion 28a thereby compressing the compression ring 28b, the first flat washer 32a, the first neoprene gasket 30 and the second flat washer 32b together to form a substantially gas-tight seal.

In a particular embodiment, the first neoprene gasket 30 may be selected from one or more of a 3¼" OD×1" ID×3/16" neoprene gasket, a 3¼" OD×1¼" ID×3/16" neoprene gasket, and a 3¼" OD×¾" ID×3/16" neoprene gasket. In a particular embodiment, the first flat washer 32a and the second flat washer 32b are each a 1½"×¾" flat steel washer. In a particular embodiment, the compression coupling 28 is a 2" IPS SDR-11 PE compression coupling #565752101700 by Continental Industries.

The gas diversion device 2 may further include an expansion plug tool 36. The expansion plug tool 36 includes a length of a shaft having a handle on one end and an attachment point on the opposite end. The threaded cap 18 is configured with a hole sized to allow the handle of the expansion plug tool 36 to pass through, but too small to allow the expansion plug itself to pass through. Therefore, during use the threaded cap 18 is removed from the body of the device 2 and the handle of the expansion plug tool passes through the hole in the threaded cap and a second neoprene gasket 38 and opening steel washer 40 are disposed around an attachment shaft of an expansion plug 42. The attachment point of the expansion plug 42 is then coupled to the expansion plug tool 36 such that the second neoprene gasket 38, opening steel washer 40 and expansion plug 42 are disposed on opposite sides of the threaded cap 18 at the handle portion of the expansion plug tool 36. The threaded cap 18 is then threadedly coupled to the slip to thread male adapter 16 such that a portion of the expansion plug tool 36, the second neoprene gasket, the opening steel washer 40 and the expansion plug 42 are slidedly disposed within the central bore (i.e., longitudinal passageway) of the gas diversion device 2 wherein the central bore is formed of the inner portions of the first straight pipe section 10, the Y-pipe 4, and the second straight pipe section 14. In a particular embodiment, the expansion plug tool 36 is a 36" expansion plug tool and the expansion plug 42 is a ½" through 1¼" expansion plug as are known in the art. The expansion plug tool 36 and the expansion plug 42 attachment functions in such a way that turning of the handle portion of the expansion plug tool 36 by a user results in a diametric expansion (i.e., the diameter gets larger) of the expansion plug 42. This allows the formation of a gas-tight or a substantially gas-tight seal against the inner surfaces of the broken gas riser 304a (FIG. 3) when the gas diversion device 2 is used. The expansion plug tool 36 further provides for detachment of the expansion plug 42 therefrom by the user so that the expansion plug can remain in the gas riser. In a particular embodiment, the second neoprene gasket 38 is a 1½" OD×0.740" ID×3/16" neoprene gasket and the opening steel washer 40 is a ¾" opening steel washer.

The gas diversion device 2 further includes an electrically conductive grounding cable 44 having a first end adapted to be coupled to the grounding bolt 22 of the conductive pipe 20 between the grounding bolt washer 24 and the grounding bolt nut 26. A second end of the grounding cable 44 is adapted to be coupled to a grounding rod 46 at a rod portion 48 thereof. The grounding rod 46 further includes a handle portion 50 affixed to the rod portion 48. In a particular embodiment, the second end of the grounding cable 44 is affixed to the rod portion 48 via a grounding rod washer's 52 and grounding rod nut 54. In at least one embodiment, the rod portion 48 is constructed of a substantially electrically conductive material while the handle portion 50 is constructed of a substantially non-conductive material. The grounding rod 46 is adapted to discharge build-up of static charge on the conductive pipe 20 which may occur, for example, as a result of gas flowing therethrough.

Figure 2:
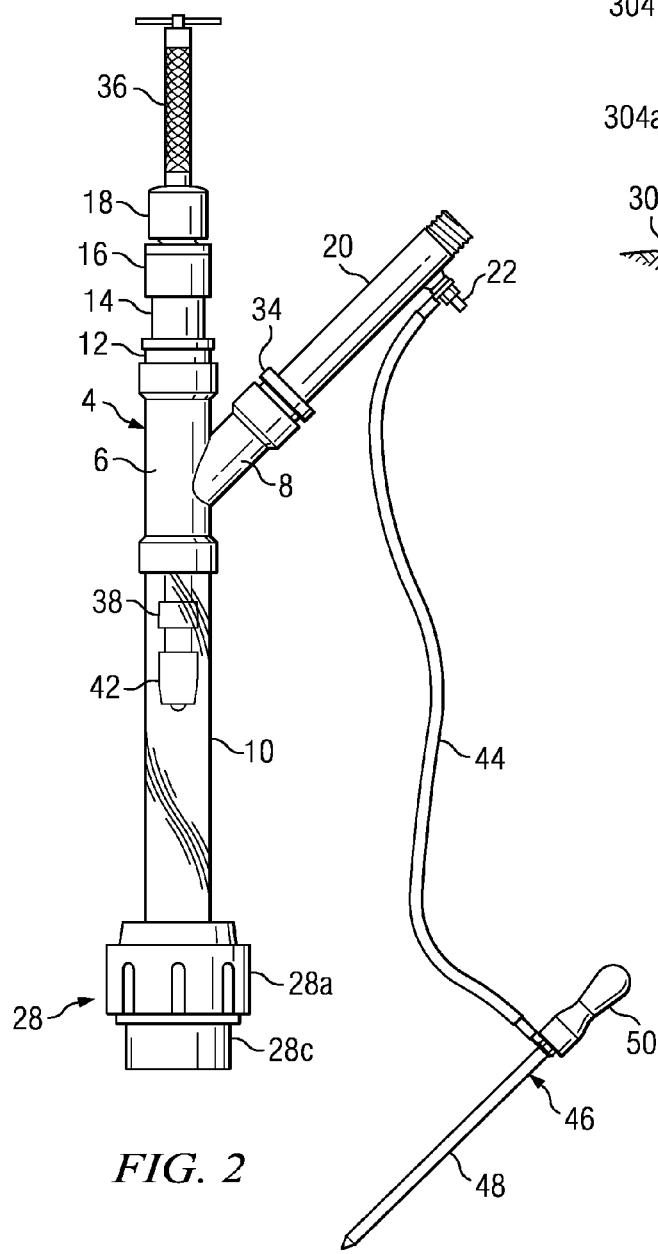
FIG. 2 illustrates a profile view of the embodiment of the gas diversion device of FIG. 1 in an assembled form.

FIG. 2 illustrates a profile view of the embodiment of the gas diversion device 2 of FIG. 1 in an assembled form. In the particular embodiment illustrated in FIG. 2, the Y-pipe 4, the first straight pipe section 10, the female portion 28a of the compression coupling 28, female threaded adapter 34, the female slip adapter 12, the second straight pipe section 14, and the slip to thread male adapter 16 are permanently coupled together. The threaded cap 18 is threadably coupled to the slip to thread male adapter 16 and may be removed to allow the expansion plug tool 36 and expansion plug 42 to be inserted into the central bore of the gas diversion device 2. After insertion of the expansion plug tool 36 and the expansion plug 42 into the gas diversion device 2, the threaded cap 18 (i.e., the first partial closure) may be threaded back onto the slip to thread male adapter 16. The male portion 28c of the compression coupling 28 (i.e., the second partial closure) is threaded coupled to the female portion 28a to allow removal thereof to facilitate the insertion of a selected first neoprene gasket 30, first flat washer 32a, and a second flat washer 32b in a stacked configuration into the female portion 28a. The male portion 28c and the female portion 28a may then be threaded together to compress the stacked configuration against the compression ring 30b in order to form a substantially gas-tight seal.

Figure 3:
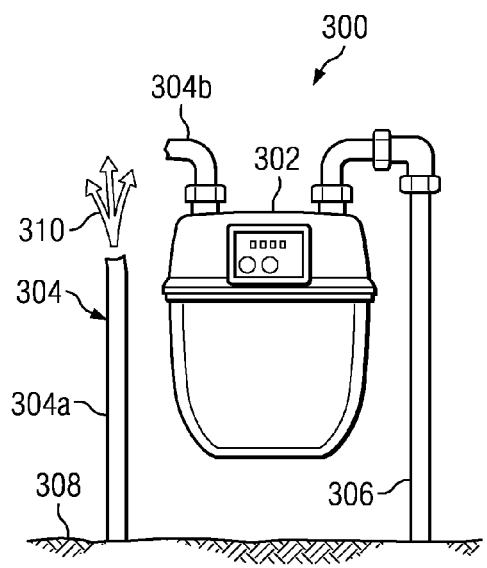
FIG. 3 illustrates a gas pipe or service riser of a gas meter that has been damaged and requires repair.

FIG. 3 illustrates a gas pipe service riser of a gas meter 300 that has been damaged and requires repair. The gas meter 300 includes a meter body 302, an inlet service riser 304, and an outlet service riser 306. Each of the inlet service riser 304 and the outlet service riser 306 have a first end coupled to the meter body 302 and a second end affixed to the ground 308. The inlet service riser 304 receives a supply of gas, such as natural gas or propane, from a gas source and provides a supply of gas to the meter body 302. The meter body 302 measures an amount of gas flowing therethrough and provides the gas to the outlet service riser 306. The outlet service riser 306 provides the supply of gas to a consumer, such as a homeowner. In the illustration of FIG. 3, the inlet service riser 304 has been broken into two portions: a first portion 304a, still affixed to the ground 308, and a second portion 304b still affixed to the meter body 302. The first portion 304a has an open end allowing gas 310 to be vented to the area around the gas meter 300. In order to repair the broken inlet service riser 304, a repair technician travels to the site of the gas meter 300, employs the gas diversion device 2 to stop the flowing of the gas 310 from the inlet service riser 304, and repairs the inlet service riser 304.

Figure 4:
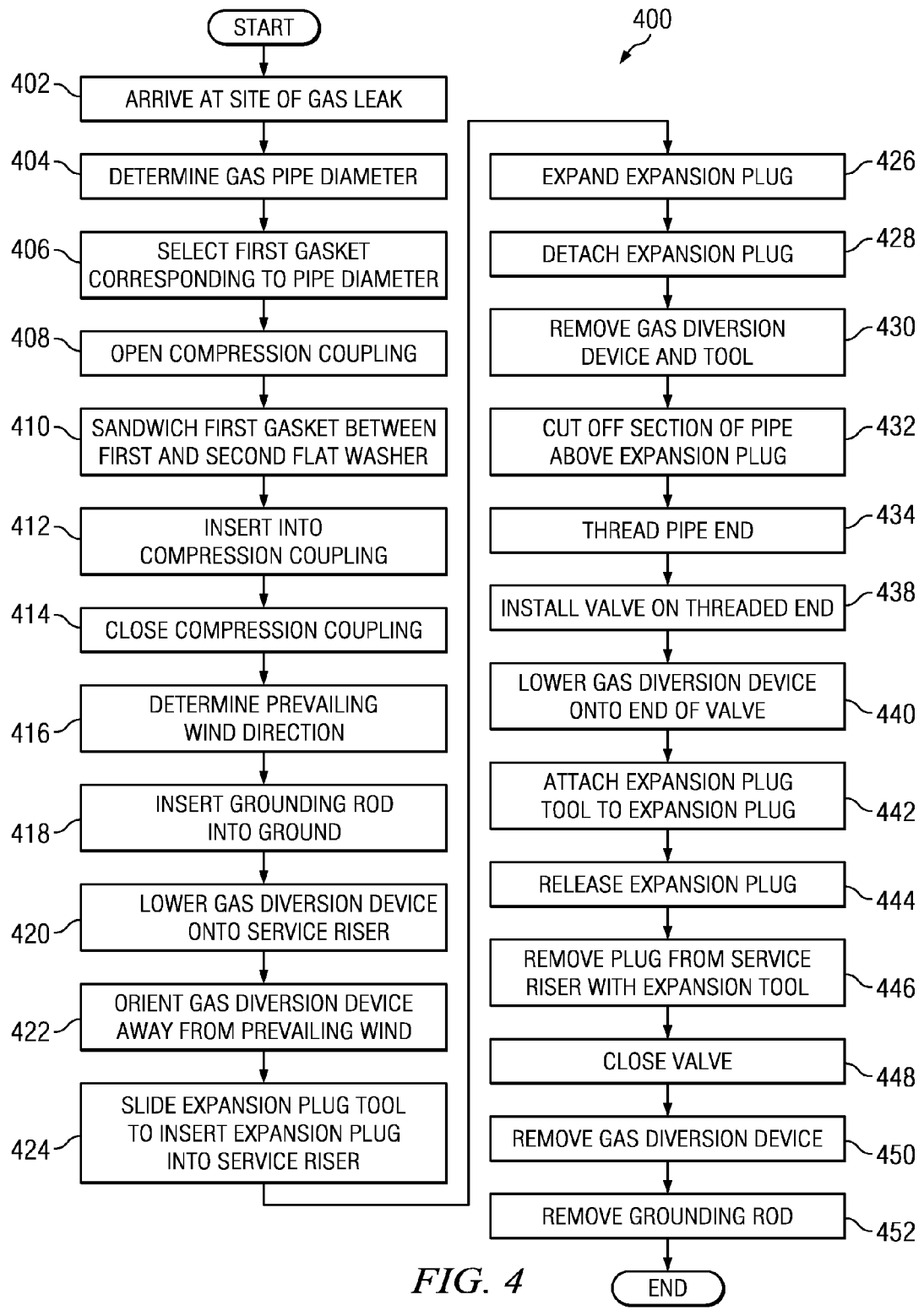
FIG. 4 illustrates an embodiment of a procedure for repairing a service riser using the gas diversion device.
Figure 5A:
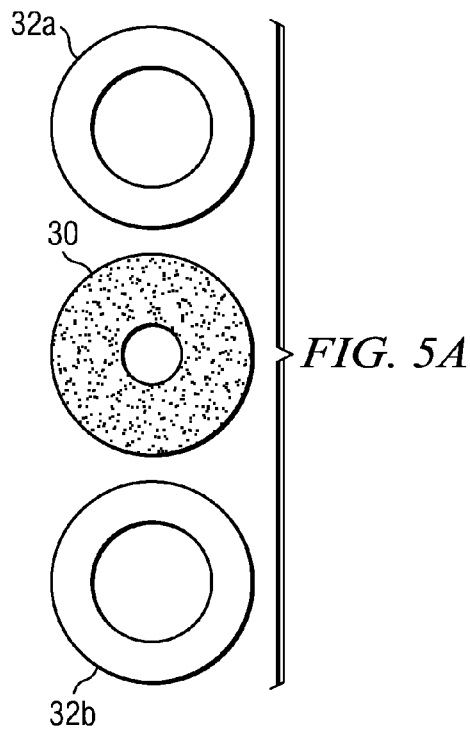
FIG. 5a illustrates embodiments of a first neoprene gasket, a first flat washer, and a second flat washer of the gas diversion device.
Figure 5B:
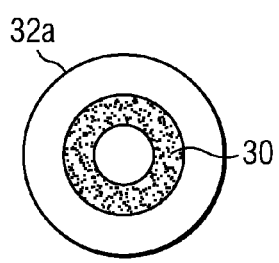
FIG. 5b illustrates a top view of the first neoprene gasket sandwiched between the first flat washer and the second flat washer.
Figure 5C:
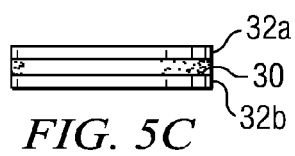
FIG. 5c illustrates a side view of the first neoprene gasket sandwiched between the first flat washer and the second flat washer.

FIG. 4 illustrates an embodiment of a procedure 400 for repairing a service riser using the gas diversion device 2. In step 402, a repair technician or worker arrives at the site of the gas leak. In a particular embodiment, the site of the gas leak includes the gas meter 300 of FIG. 3. In still other embodiments, the site of the gas leak may include any location in which an exposed portion of a gas pipe has been broken and requires repair. In step 404, the technician determines the gas pipe diameter of the inlet service riser 304. In step 406, a first neoprene gasket 30 having an inner diameter corresponding to the outer diameter of the inlet service riser 304 is selected. In a particular embodiment, the first neoprene gasket 30 is selected from among a number of gaskets having inner diameters corresponding to the outer diameter of inlet service risers in common use. In step 408, the compression coupling 28 is opened. Opening of the compression coupling 28 involves unscrewing of the male portion 28c from the female portion 28a. In step 410, the first neoprene gasket 30 is sandwiched between the first flat washer 32a and the second flat washer 32b. FIG. 5a illustrates embodiments of the first neoprene gasket 30, the first flat washer 32a and the second flat washer 32b of the gas diversion device 2. In the particular embodiment illustrated in FIG. 5a, the outer diameters of the first neoprene gasket 30, the first flat washer 32a, and the second flat washer 32b are substantially the same, while the inner diameter of the first neoprene gasket 30 is smaller than the inner diameters of the first flat washer 32a and the second flat washer 32b. FIG. 5b illustrates a top view of the first neoprene gasket 30 sandwiched between the first flat washer 32a and the second flat washer 32b. The outer circle represents the inner diameter of the first flat washer 32a and second flat washer 32b, while the inner circle represents the inner diameter of the first neoprene gasket 30. FIG. 5c illustrates a side view of the first neoprene gasket 30 sandwiched between the first flat washer 32a and the second flat washer 32b. Returning now to FIG. 4, the stacked arrangement of the first neoprene gasket 30 and the first flat washer 32a and the second flat washer 32b are inserted into the female portion 28a of the compression coupling 28 against the compression ring 28b. In step 414, the compression coupling 28 is closed by screwing of the male portion 28c into the female portion 28a. Preferably, the inner diameter of the flexible gasket 30 and flat washers 32a and 32b are selected to be compatible with the diameter of the broken riser pipe 304a such that substantially gas-tight seal is formed when the riser pipe passes through he gasket assembly (30, 32a and 32b). Multiple gasket assemblies of different sized can be interchangeably used in the device 2 to accommodate different sizes of riser assemblies.

Figure 6:
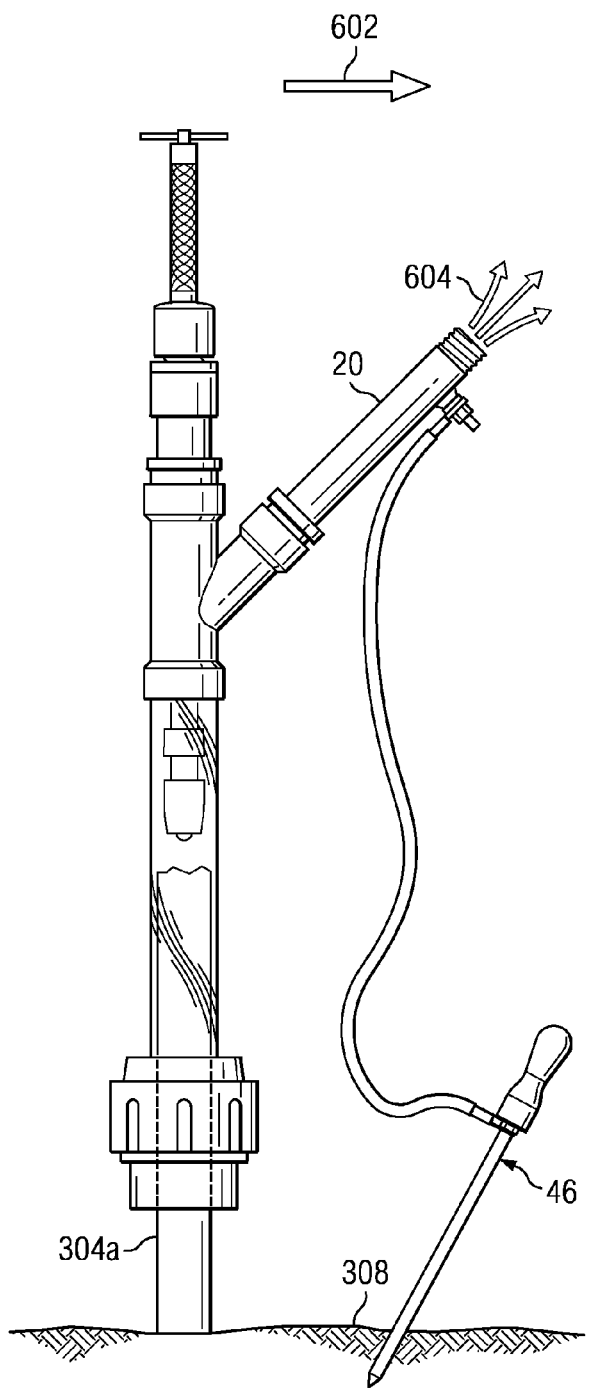
FIG. 6 illustrates the gas diversion device being placed over a service riser and a grounding rod being placed within the ground.

In step 416, the prevailing wind direction is determined by the technician. In step 418, the grounding rod 46 is inserted into the ground 308 proximate to the inlet service riser 304a. In step 420, the gas diversion device 2 is lowered onto the inlet service riser 304a. This is accomplished by placing the gas diversion device 2 onto the inlet service riser 304a such that the end of the inlet service riser 304a passes through the compression coupling 28, the first neoprene gasket and into the first straight pipe section 10. When the gas diversion device 2 is lowered onto the inlet service riser 304a, the expansion plug tool 36 is already inserted into the threaded cap 18 and the threaded cap 18 is screwed onto the slip to thread male adapter 16. The expansion plug tool 36 is in an up-mounted position within the gas diversion device 2. FIG. 6 illustrates the gas diversion device 2 being placed over the inlet service riser 304a and a grounding rod 46 being placed within the ground 308. The grounding rod 46 provides an electrical connection between the steel pipe 20 and the ground 308 to prevent undesirable buildup of a static charge on the steel pipe 20 due to the flow of gas therethrough. An undesired buildup of static charge may cause the gas flowing therethrough to ignite. In step 422, the gas diversion device 2 is oriented away from the prevailing wind 602. By orienting the gas diversion device 2 in this manner, gas escaping from the inlet service riser 304a is diverted 604 away from the technician using the gas diversion device 2 through the steel pipe 20.

Figure 7:
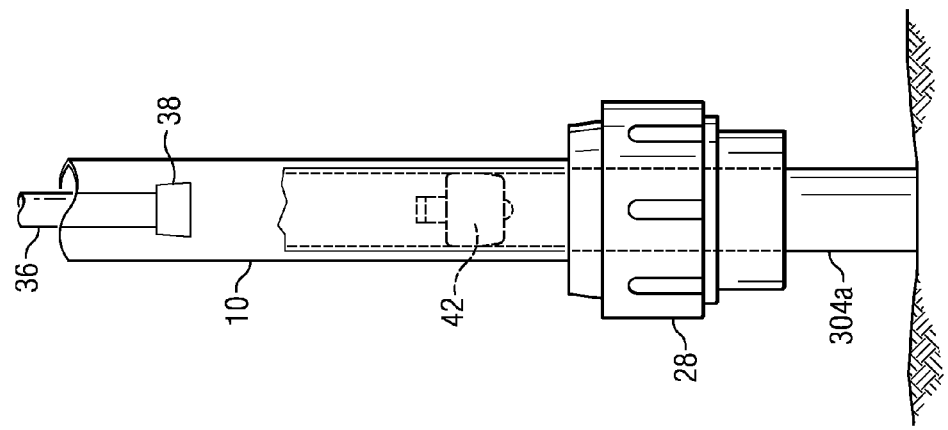
FIG. 7 illustrates an embodiment in which the expansion plug tool has been detached from the expansion plug and slid upward into the first straight pipe section of the gas diversion device.

In step 424, the expansion plug tool 36 is slid from the up-mounted position downward through the central bore of the gas diversion device 2 to insert the expansion plug 42 into the bore of the service riser 304a. During the sliding of the expansion plug tool 36, the gas continues to be diverted through the bifurcated path of the Y-pipe, through the conductive pipe 20 and away from the technician. The expansion plug 42 is inserted into the inlet service riser 304a to an appropriate depth so as to enable cutting off of an upper portion of the inlet service riser 304a and threading thereof. The transparent portion of the first straight pipe section 10 (i.e., lower portion of the body) allows the user of the gas diversion device 2 to directly view the expansion plug 42 and the end of the riser 304a when they are inside the device to more easily insert the expansion plug into the inlet service riser and gauge the insertion depth. In step 426, the expansion plug 42 is expanded by the user of the expansion plug tool 36 twisting the handle thereof. This results in the expansion plug increasing in diameter a sufficient amount to securely press against the inside surface of the inlet service riser 304a. This creates a seal within the inlet service riser 304a thereby preventing the further flow of gas out of the inlet service riser 304a. Once the expansion plug 42 stops the flow of gas, the gas is no longer exhausted through the gas diversion device 2. In step 428, the expansion plug 42 is detached from the expansion plug tool 36 by the user. FIG. 7 illustrates an embodiment in which the expansion plug tool 36 has been detached from the expansion plug 42 and slid upward into the first straight pipe section 10 of the gas diversion device 2. As can be seen in FIG. 7, the expansion plug 42 is compressed against the inner surface of the inlet service riser 304a thus preventing gas from leaking therefrom.

Figure 9:
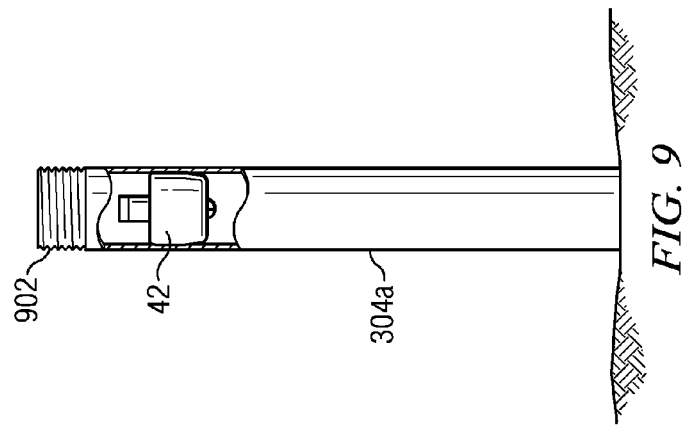
FIG. 9 illustrates the service riser having a threaded portion and including the expansion plug disposed therein.
Figure 8:
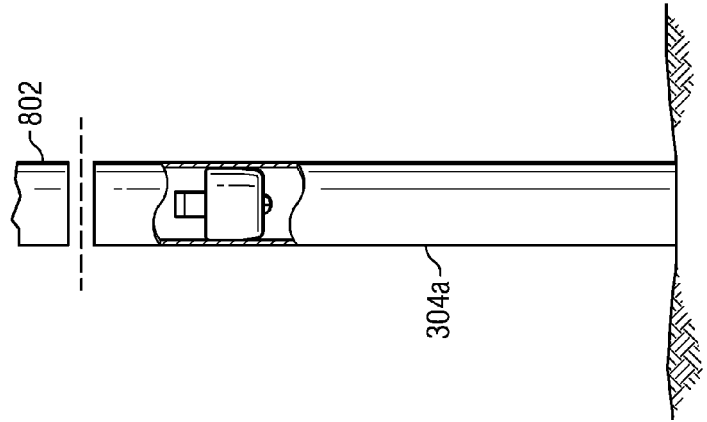
FIG. 8 illustrates an embodiment in which a section of the service riser has been cut off above the expansion plug.

In step 430, the gas diversion device 2 and expansion plug tool 36 are removed from the inlet service riser 304a. In step 432, a section 802 of the inlet service riser 304a is cut off above the expansion plug 42 as illustrated in FIG. 8. The section 802 is then discarded. In step 434, a portion of the pipe end of the inlet service riser 304a is threaded 902. FIG. 9 illustrates the inlet service riser 304a having a threaded portion 902 and including the expansion plug 42 disposed therein.

Figure 10:
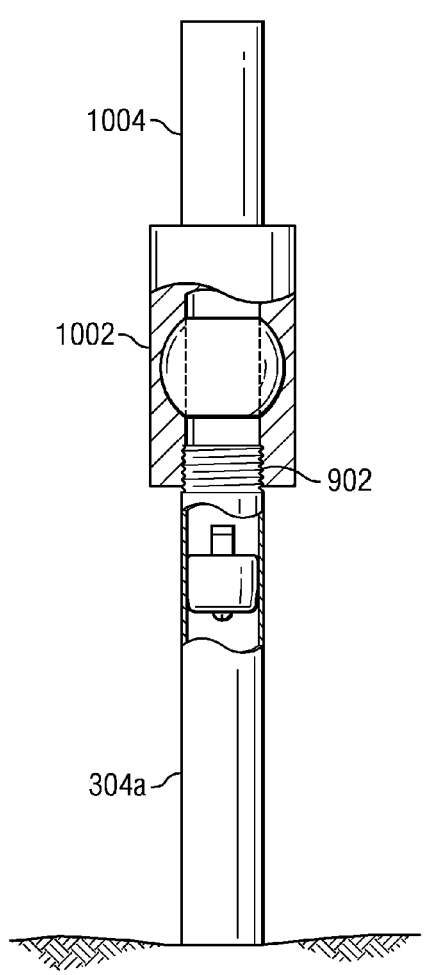
FIG. 10 illustrates an embodiment in which the valve is installed on the threaded end of the service riser with the valve being in the opened position.
Figure 11:
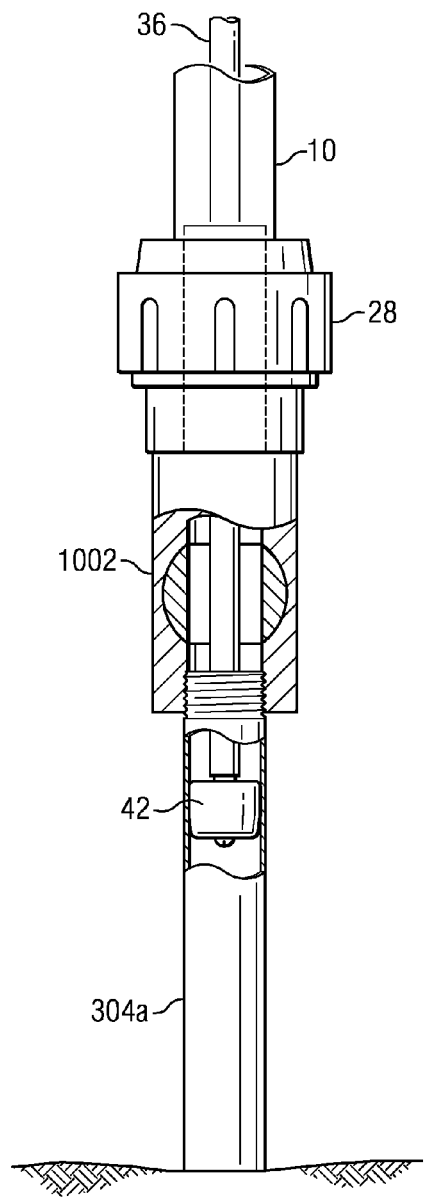
FIG. 11 illustrates an embodiment in which the expansion plug tool has been reattached to the expansion plug and passes through the valve.
Figure 12:
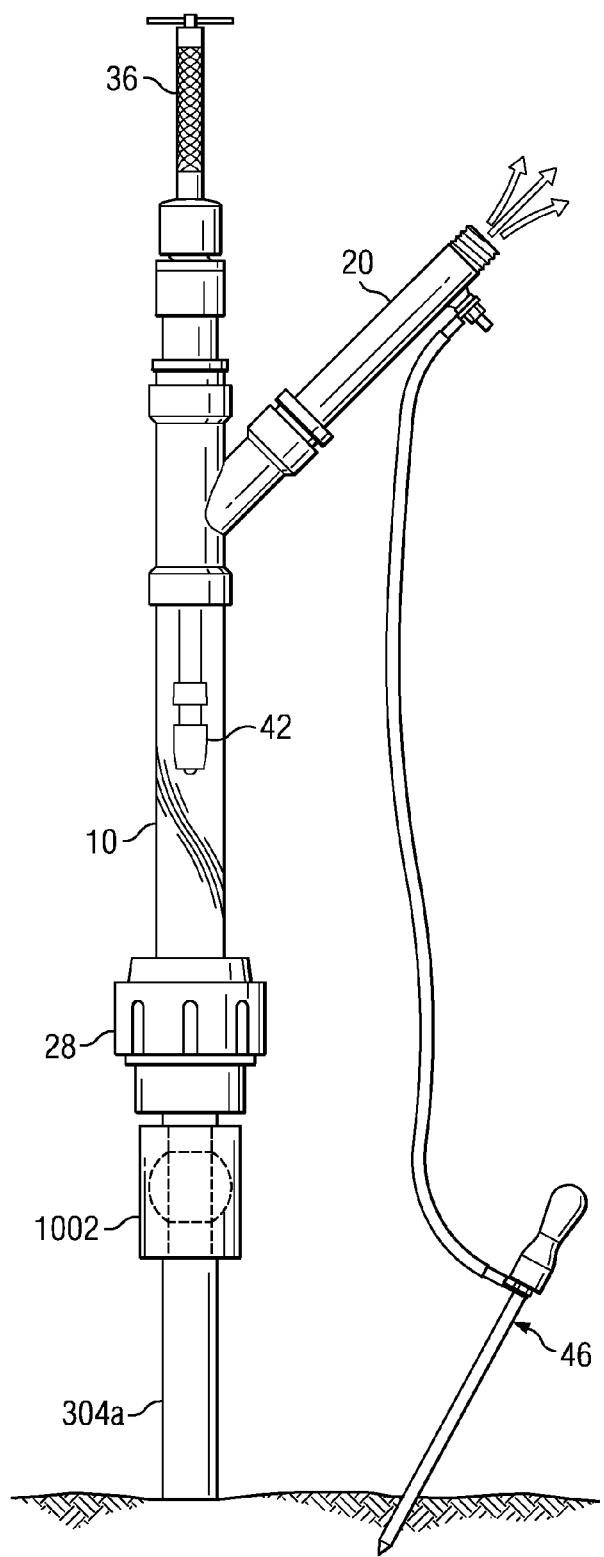
FIG. 12 illustrates the expansion plug being removed from the service riser and the gas being diverted from the gas diversion device.

In step 438, a valve 1002 is installed in the threaded end 902 of the inlet service riser 304a with the valve 1002 being in an opened position. FIG. 10 illustrates an embodiment in which the valve 1002 is installed on the threaded end of the inlet service riser 304a with the valve 1002 being in the opened position. In a particular embodiment, the valve 1002 is a ball valve or other full opening valve. In various embodiments, the valve 1002 may include a nipple 1004 on its upper side to facilitate reattachment of the gas diversion device 2. In step 440, the gas diversion device 2 is lowered onto the end of the valve 1002. In at least one embodiment, the gas diversion device 2 is lowered onto the nipple 1004 of the valve 1002. In step 442, the expansion plug tool 36 is lowered through the open valve 1002 and reattached to the expansion plug 42. FIG. 11 illustrates an embodiment in which the expansion plug tool 36 has been reattached to the expansion plug 42 and passes through the valve 1002. In step 444, the expansion plug 42 is released such that it is no longer compressed against the interior surfaces of the inlet service riser 304a. In step 446, the expansion plug tool 36 is raised upward to remove the expansion plug 42 from the inlet service riser 304a. As a result, gas again begins to flow out of the inlet service riser 304a and is diverted out of the steel pipe 30 away from the user. FIG. 12 illustrates the expansion plug 42 being removed from the inlet service riser 304a and the gas being diverted from the gas diversion device 2.

Figure 13:
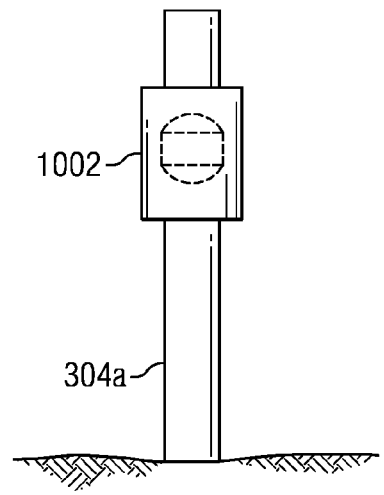
FIG. 13 illustrates a repaired service riser having the valve affixed thereto.

In step 448, the valve 1002 is placed into the closed position thereby shutting off the flow of gas from the inlet service riser 304a. In step 450, the gas diversion device 2 is removed from the valve 1002. In step 452, the grounding rod 46 is removed from the ground. FIG. 13 illustrates a repaired inlet service riser 304a having the valve 1002 affixed thereto. At a later time, the same or another technician may return to the site to install a new gas meter 300 and couple it to the inlet service riser 304a. Gas service may then be restored to the customer.

Although the preferred embodiment has been described in detail, it should be understood that various changes, substitutions and alterations can be made therein without departing from the spirit and scope of the invention as defined by the appended claims.

What is claimed is:

1. A gas diversion device comprising:
   a compression coupling having a first gasket disposed therein;
   a first straight pipe section having a first open end and a second open end, the first open end being coupled to the compression coupling;
   a Y-pipe having a first Y-pipe portion including a first Y-pipe open end and a second Y-pipe open end, the first Y-pipe open end being coupled to the second open end of the first straight pipe section, the Y-pipe further including a second Y-pipe portion having a second Y-pipe portion open end;
   an electrically conductive pipe having a first end coupled to the second Y-pipe portion open end;
   a slip to thread male adaptor coupled to the second Y-pipe open end, the slip to thread adaptor having a first threaded portion; and
   a threaded cap threadably coupled to the first threaded portion and having a first hole therethrough;
   wherein the compression coupling is adapted to be placed over an open end of a gas pipe service riser and wherein the first straight pipe section is adapted to receive a portion of the gas pipe service riser therein; and
   wherein the threaded cap is adapted to receive an expansion plug tool through the first hole and wherein the first Y-pipe portion and the first straight pipe portion are adapted to slideably receive a portion of the expansion plug tool therein, the expansion plug tool further including an expansion plug coupled thereto to facilitate positioning of the expansion plug within the open end of the gas pipe service riser.

2. The gas diversion device of claim 1 further comprising:
   a female slip adaptor and a second straight pipe section coupled thereto, wherein the slip to thread male adaptor is coupled to the second Y-pipe open end by the female slip adaptor and the second straight pipe section.

3. The gas diversion device of claim 1, wherein the first gasket is selected from a plurality of gaskets, the selected first gasket having an inner diameter corresponding to an outer diameter of the gas pipe service riser.

4. The gas diversion device of claim 1, wherein the first straight pipe section is formed of a substantially transparent material to facilitate positioning of the expansion plug within the open end of the gas pipe service riser.

5. The gas diversion device of claim 1 further comprising:
   a ground connection being adapted to provide an electrical connection between the electrically conductive pipe and a ground.

6. The gas diversion device of claim 1 wherein the compression coupling includes:
   a female portion;
   a compression ring; and
   a male portion;
   wherein the compressing ring is disposed between first gasket and the female portion and wherein the male portion is threadably coupled to the female portion.

7. A method for diverting gas from a broken gas pipe service riser using a gas diversion device, the gas diversion device having:
   a compression coupling;
   a first straight pipe section having a first open end and a second open end, the first open end being coupled to the compression coupling;
   a Y-pipe having a first Y-pipe portion including a first Y-pipe open end and a second Y-pipe open end, the first Y-pipe open end being coupled to the second open end of the first straight pipe section, the Y-pipe further including a second Y-pipe portion having a second Y-pipe portion open end;
an electrically conductive pipe having a first end coupled to the second Y-pipe portion open end;
a slip to thread male adaptor coupled to the second Y-pipe open end, the slip to thread adaptor having a first threaded portion; and
a threaded cap threadably coupled to the first threaded portion and having a first hole therethrough;
the method comprising:
selecting a first gasket having an inner diameter corresponding to an outer diameter of the broken gas pipe service riser;
disposing the first gasket within the compression ring;
placing the compression coupling over an open end of the broken gas pipe service riser such that the open end of the broken gas pipe service riser passes through the first gasket and the first pipe section receives a portion of the gas pipe service riser therein;
sliding a portion of an expansion plug tool having an expansion plug attached thereto through the first hole, the first Y-pipe portion and the first straight pipe section;
positioning the expansion plug within the open end of the gas pipe service riser; and
detaching the expansion plug from the expansion plug tool.

8. The method of claim 7 further comprising:
removing the gas diversion device from the gas pipe service riser.

9. The method of claim 8 further comprising:
cutting off a portion of the open end of the broken gas pipe service riser above the expansion plug positioned therein.

10. The method of claim 9 further comprising:
threading the open end of the broken gas pipe service riser.

11. The method of claim 10 further comprising:
attaching a valve to a threaded open end of the gas pipe service riser; and
placing the compression coupling over a portion of the valve such that a portion of the valve passes through the first gasket and the first pipe section receives the portion of the valve therein.

12. The method of claim 11 further comprising:
reattaching the expansion plug tool to the expansion plug; and
sliding the expansion plug tool up to remove the expansion plug through the valve and from the open end of the gas pipe service riser.

13. The method of claim 12 further comprising:
closing the valve; and
removing the gas diversion device from the valve.

14. A gas diversion device comprising:
an elongated body having an upper end and a lower end, the body defining an enclosed longitudinal passageway disposed along a longitudinal axis between the upper end and the lower end;
the body further having an upper portion proximate to the upper end and a lower portion proximate to the lower end;
the upper portion including a bifurcated section defining a first path and a second path, the first path constituting a portion of the longitudinal passageway and the second path originating from the longitudinal passageway and extending from the side of the body at an angle to the longitudinal axis;
the lower portion being at least partially formed of a transparent material such that the interior of the longitudinal passageway is visible through the body from the exterior of the body;
a first partial closure removably mountable on the upper end of the body, the first partial closure defining, when mounted on the upper end of the body, a first hole therethrough generally aligned with the longitudinal axis and having a cross-sectional area that is smaller than the cross-sectional area of the longitudinal passageway at the upper end of the body;
a second partial closure mounted on the lower end of the body, the second partial closure defining a second hole therethrough generally aligned with the longitudinal axis and having a cross-sectional area that is smaller than the cross-sectional area of the longitudinal passageway at the lower end of the body; and
an electrically conductive pipe having a first end coupled to the bifurcated section and defining an enclosed passageway disposed along the second path extending away from the body, the enclosed passageway being in fluid communication with the longitudinal passageway of the body.

15. The gas diversion device of claim 14, wherein the first partial closure is configured such that the first hole is large enough to allow the passage of an expansion plug tool from the exterior of the device into the longitudinal passageway, but too small to allow the passage of an expansion plug from the exterior of the device into the longitudinal passage.

16. The gas diversion device of claim 15, wherein the first partial closure is removably mounted to the upper end of the body by means of a threaded connection.

17. The gas diversion device of claim 14, wherein the second partial closure further comprises a flexible annular gasket configured to provide a substantially gas-tight seal around a pipe of a predetermined diameter extending from the exterior of the device into the lower portion of the longitudinal passageway.

18. The gas diversion device of claim 17, wherein the second partial closure includes an upper portion removably connected to a lower portion such that the flexible annular gasket is removably held in position therebetween when the lower portion is connected to the upper portion.

19. The gas diversion device of claim 18, wherein the second partial closure is configured to interchangeably hold any one of a plurality of flexible annular gaskets configured to seal around pipes of different predetermined diameters.

20. The gas diversion device of claim 14, further comprising a ground connection configured provide an electrical connection between the electrically conductive pipe and a ground.

* * * * *